(12) United States Patent
Le Dantec

(10) Patent No.: US 6,876,814 B1
(45) Date of Patent: Apr. 5, 2005

(54) DIGITAL FORMAT COMPRESSION AND DECOMPRESSION IN WHICH INFORMATION REPRESENTING A PHYSICAL QUANTITY IS ACCOMPANIED BY PREDICTABLE DATA

(75) Inventor: Claude Le Dantec, Saint Hilaire des Landes (FR)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/436,990

(22) Filed: Nov. 9, 1999

(30) Foreign Application Priority Data

Nov. 10, 1998 (FR) .......................................... 98 14149

(51) Int. Cl.$^7$ .............................. H04N 7/26; H04N 5/85
(52) U.S. Cl. ....................... 386/109; 386/124; 386/125
(58) Field of Search ........................... 386/3, 111–112, 386/109, 27, 33, 124, 125, 126, 105, 106, 45, 40, 46, 1; 375/240.01, 240.26; 370/473, 474, 477; H04N 7/26, 5/85

(56) References Cited

U.S. PATENT DOCUMENTS

| | | | | |
|---|---|---|---|---|
| 4,249,264 A | * | 2/1981 | Crochet et al. ............. | 359/118 |
| 4,456,956 A | * | 6/1984 | El-Gohary et al. ......... | 709/225 |
| 5,473,377 A | * | 12/1995 | Kim ....................... | 375/240.03 |
| 5,600,316 A | * | 2/1997 | Moll ........................... | 341/87 |
| 6,111,871 A | * | 8/2000 | Chen et al. .................. | 370/349 |
| 6,144,658 A | * | 11/2000 | Lebizay et al. ............. | 370/352 |
| 6,172,989 B1 | * | 1/2001 | Yanagihara et al. ........ | 370/473 |
| 6,226,443 B1 | * | 5/2001 | Morioka et al. .............. | 386/82 |
| 6,373,856 B1 | * | 4/2002 | Higashida .................... | 370/474 |
| 6,389,038 B1 | * | 5/2002 | Goldberg et al. ........... | 370/471 |
| 6,501,904 B1 | * | 12/2002 | Kuroda et al. .............. | 386/109 |

FOREIGN PATENT DOCUMENTS

| | | |
|---|---|---|
| EP | 0633692 | 1/1995 |
| WO | 9715164 | 4/1997 |

OTHER PUBLICATIONS

Merriam Webster's Collegiate Dictionary 1997, Merriam–Webster, Inc., Tenth Edition, p. 918.*

Light, et al., "Delivering Digital Video Over IEEE 1394", Proceedings of the 1997 16th ICCE, Rosemont, Ill., pp. 334–335.

Seong, Goan–Soo, "Empty Packet Insertion Controller for SD–DVCR DIF", Proceedings of the 16th ICCE, Rosemont, Ill., pp. 56–57.

Hasegawa, et al., "Low–Power Video Encoder/Decoder Chip Set for Digital VCR's", IEEE Journal of Solid–State Circuits, Nov. 1, 1996, vol. 31, No. 11, pp. 1780–1788.

* cited by examiner

*Primary Examiner*—Robert Chevalier
(74) *Attorney, Agent, or Firm*—Fitzpatrick, Cella, Harper & Scinto

(57) ABSTRACT

A compression method adapts a digital format in which information representing a physical quantity is accompanied by predictable data having a value independent of that of the information representing a physical quantity. The method includes an operation of reducing the number of the predictable data, the data and information representing a physical quantity resulting from this reduction operation being able to allow the reconstitution of predictable data accompanying the information representing a physical quantity, in accordance with the digital format. Preferentially, the reduction operation includes a step of removing the predictable data, and a step of inserting substitution data, having a number less than the number of data removed during the removal step.

21 Claims, 12 Drawing Sheets

|  | $ID_0$ | $ID_1$ | $ID_2$ |
|---|---|---|---|
| MSB | $SCT_2$ | $D_{seq3}$ | $DBN_7$ |
|  | $SCT_1$ | $D_{seq2}$ | $DBN_6$ |
|  | $SCT_0$ | $D_{seq1}$ | $DBN_5$ |
|  | RSV | $D_{seq0}$ | $DBN_4$ |
|  | $Seq_3$ | 0 | $DBN_3$ |
|  | $Seq_2$ | RSV | $DBN_2$ |
|  | $Seq_1$ | RSV | $DBN_1$ |
| LSB | $Seq_0$ | RSV | $DBN_0$ |

Fig. 4

| SCT₂ | SCT₁ | SCT₀ | Type of section |
|---|---|---|---|
| 0 | 0 | 0 | Header |
| 0 | 0 | 1 | Subcodes |
| 0 | 1 | 0 | VAUX |
| 0 | 1 | 1 | Audio |
| 1 | 0 | 0 | Video |
| 1 | 0 | 1 | |
| 1 | 1 | 0 | Reserved |
| 1 | 1 | 1 | |

Fig. 5

DIGITAL FORMAT COMPRESSION AND DECOMPRESSION IN WHICH INFORMATION REPRESENTING A PHYSICAL QUANTITY IS ACCOMPANIED BY PREDICTABLE DATA

The present invention concerns a method and device for compressing information without loss.

It applies in particular to the compression of the format known as DV (Digital Video) with a wireless communication medium.

The transmission of coded image data, in accordance with the DV standard IEC 61834 or the document "Specifications of consumer-use digital VCRs using 6.3 mm magnetic tape" published in December 1994 by the "HD Digital VCR Conference", known as the "Blue Book", requires a large passband.

In a wireless transmission, the technical and regulatory constraints generally limit the passband. The main problem which the present invention attempts to resolve is to reduce the passband required for the transmission of information or the storage of information, for example image information, on a transmission medium, for example wireless.

The second problem which the present invention attempts to resolve is to allow the reconstitution of a DV image format on reception of the data transmitted over the transmission medium.

The present invention thus aims to avoid any loss of data during the transmission of information.

In addition the present invention aims to afford a simple solution for at least one of the problems set out above.

To this end, the present invention relates, according to a first aspect, to a method of compressing a digital format in which information representing a physical quantity is accompanied by predictable data and whose value is independent of that of the information representing a physical quantity, characterised in that it includes an operation of reducing the number of said predictable data, the data and information representing a physical quantity resulting from this reduction operation being capable of allowing the reconstitution of predictable data accompanying the information representing a physical quantity, in accordance with the said digital format.

By virtue of these provisions, the number of predictable data is reduced, and the passband necessary for the transmission representing a physical quantity and the size of the memory necessary for the storage of this information are reduced.

In addition, because the data and information resulting from the reduction operation are able to allow the reconstitution of the predictable data, the format in which the data were initially represented can be reconstituted.

Finally, since the information representing a physical quantity is not affected by the method which is the object of the present invention, no loss of this information occurs.

According to particular characteristics, the digital format including successive repetitions of data and/or iterative series of data, during the removal operation, at least two data items of said repetitions or said series are removed, and during the insertion operation, at least one data item of said repetitions or said series is inserted, in a header relating to all the information to be transmitted.

By virtue of these provisions, when the removed predictable data consist of successive repetitions of the same data or iterative series of data, some of the elements of this repetition or of this series, inserted in a header relating to all the information to be transmitted, makes it possible to reduce the number of predictable data without losing information on these predictable data.

According to particular characteristics, said format is the DV format, and the method of the invention includes an operation of transmitting at a distance the data resulting from the reduction operation.

By virtue of each of these provisions, the invention makes it possible to adapt the DV format to a wireless transmission, for example radio or optical, or to a recording on a data medium.

According to particular characteristics, during the operation of inserting so-called substitution data, an identifier is inserted for at least one of the parts of said set of data.

By virtue of these provisions, said identifier marks at least a part of the data and the other parts can then be marked with respect to the first.

According to particular characteristics, the method which is the object of the present invention, as briefly described above, includes an operation of determining a reduction mode, during which at least one of the items of data and/or information to be transmitted is taken into account in order to determine a reduction mode and in that, during the reduction operation, the reduction mode determined during the reduction mode determination operation is used.

By virtue of these provisions, several formats, several resolutions and several compression modes, for example, can be taken into account in order to determine an adaptive reduction mode.

According to particular characteristics, the transmitted data include at least one data item representing a reduction mode used during the operation of reducing the predictable data and/or transmitted information.

By virtue of these provisions, different modes of reducing the predictable data (such as those mentioned above) and/or the transmitted information (compression of information, redundancy, puncturing, change of resolution, etc) can be used on sending, in order to conform to the constraints of the transmission channel. On reception, taken into account each data item representing the reduction mode makes it possible to make the processings carried out on the data and information transmitted conform to those carried out, at the time of sending, on the data and information to be transmitted.

It should be noted here that the data representing a reduction mode can be parameters descriptive of the format of the transmitted information, such as for example a frame number, an information number by frame, block, image etc.

According to a second aspect, the present invention relates to a data and information processing method, characterised in that it includes:

an operation of estimating the need to reduce the quantity of data and information representing a physical quantity, and when the said reduction is necessary, implementing a compression method as briefly disclosed above.

According to particular characteristics, the method as briefly disclosed above also includes:

an operation of estimating the need for compression of information representing a physical quantity, and when said compression is necessary, an operation of compressing the information representing a physical quantity.

By virtue of these provisions, the flow of data and information transmitted is adapted to the transmission channel, reducing, as a priority, the number of predictable data.

According to a third aspect, the present invention relates to a method for transmitting information representing a physical quantity, characterised in that it includes:

an operation of reducing the number of said predictable data, the data and information representing a physical quantity resulting from this reduction operation being able to allow the reconstitution of predictable data accompanying the information representing a physical quantity, in accordance with said digital format, an operation of receiving said information and said data resulting from the reduction operation, an operation of reconstituting predictable data in accordance with said digital format, said reconstituted predictable data representing said received data and being independent of said information and greater in number than the number of data received, and an operation of organising said reconstituted predictable data and said information, in accordance with said digital format.

According to a fourth aspect, the present invention relates to a method of recording information representing a physical quantity, characterised in that it includes:

an operation of reducing the number of said predictable data, the data and information representing a physical quantity resulting from this reduction operation being able to allow the reconstitution of predictable data accompanying the information representing a physical quantity, in accordance with said digital format, an operation of recording data and information representing a physical quantity resulting from this reduction operation, on a recording medium, an operation of reading said information and said data resulting from the reduction operation, on said recording medium, an operation of reconstituting predictable data in accordance with said digital format, said reconstituted predictable data representing said read data and being independent of said information and greater in number than the number of data received, and an operation of organising said reconstituted predictable data and said information, in accordance with said digital format.

According to a fifth aspect, the present invention relates to a method of receiving information representing a physical quantity accompanied by data whose value is independent of that of said information, said information and data being intended to be conformed according to a predetermined, digital format, characterised in that it includes:

an operation of reading at least part of said received data, an operation of determining predictable data representing the received data and whose value is independent of that of the information, said predictable data being greater in number than the number of received data, and an operation of organising said predictable data and said information, said organisation being in accordance with said digital format and causing predictable data and information to alternate.

According to a sixth aspect, the present invention relates to a method of transmitting information representing a physical quantity, characterised in that it includes:

an operation of determining data intended to accompany said information, data whose value is independent of that of said information, an operation of sending said information and said data, an operation of receiving said information representing a physical quantity, accompanied by said data, an operation of reading at least part of said received data, an operation of determining predictable data representing received data and whose value is independent of that of the information, said predictable data being greater in number than the number of received data, and an operation of organising said predictable data and said information, said organisation being in accordance with said digital format alternating predictable data and information.

According to a seventh aspect, the present invention relates to a method of decompressing information representing a physical quantity organised in accordance with a first structure including said information and so-called "structural" data, in frames in accordance with a second structure and also including complementary data, characterised in that it includes:

an operation of marking said information in said frames, and an operation of marking said structural data in said frames, an operation of determining so-called "predictable" data whose value is independent of said information and said complementary data, said predictable data representing structural data, an operation of organising, in accordance with a third structure, said information and said predictable data.

According to an eighth aspect, the present invention relates to a device for compressing a digital format in which information representing a physical quantity are accompanied by predictable data whose value is independent of that of the information representing a physical quantity, characterised in that it includes a means of reducing the number of said predictable data, the data and information representing a physical quantity resulting from this reduction being able to allow the reconstitution of predictable data accompanying the information representing a physical quantity, in accordance with said digital format.

According to a ninth aspect, the present invention relates to a device for receiving information representing a physical quantity accompanied by data whose value is independent of that of said information, said information and data being intended to be conformed according to a predetermined digital format, characterised in that it has:

a means of reading at least part of said received data, a means of determining predictable data representing received data and whose value is independent of that of the information, said predictable data being greater in number than the number of received data, and a means of organising said predictable data and said information, said organisation being in accordance with said digital format and causing predictable data and information to alternate.

According to a tenth aspect, the present invention relates to a device for recording information representing a physical quantity, characterised in that it includes:

a means of reducing the number of said predictable data, the data and information representing a physical quantity resulting from this reduction being able to allow the reconstitution of predictable data accompanying the information representing a physical quantity, in accordance with said digital format, a means of recording data and information representing a physical quantity resulting from this reduction, on a recording medium, a means of reading said information and said data resulting from the reduction operation, on said recording medium.

a means of reconstituting predictable data in accordance with said digital format, said reconstituted predictable data representing said read data and being independent of said information and greater in number than the number of received data, and a means of organising said reconstituted predictable data and said information, in accordance with said digital format.

According to an eleventh aspect, the present invention relates to a device for decompressing information representing a physical quantity organised in a first structure including said information and so-called "structural" data, in frames in accordance with a second structure and also including complementary data, characterised in that it has:

a marking means, adapted:
to mark said information in said frames, and
to mark said structural data in said frames, a means of determining so-called "predictable" data whose value is independent of said information and said complementary data, said predictable data representing structural data, a means of organising, in a third structure, said information and said predictable data.

The invention also relates to a network, a computer, a camera, a printer, an image storage system and an image display system, characterised in that they have a device as briefly disclosed above.

The invention also relates to:

an information storage means which can be read by a computer or a microprocessor storing instructions of a computer program, characterised in that it makes it possible to implement the method of the invention as briefly disclosed above, and an information storage means which is removable, partially or totally, and which can be read by a computer or a microprocessor storing instructions of a computer program, characterised in that it makes it possible to implement the method of the invention as briefly disclosed above.

The preferential or particular characteristics, and the advantages of the second to the eleventh aspects of the present invention, of this network, of this computer, of this camera, of this printer, of this image storage system, of this image display system and of these information storage means being identical to those of the method as briefly disclosed above, these advantages are not repeated here.

Other advantages, aims and characteristics of the present invention will emerge from the description which follows, given with regard to the accompanying drawings, in which:

FIG. 4 depicts identification data for a data block illustrated in FIG. 3;

FIG. 5 depicts values taken by identification data for the block illustrated in FIG. 4;

In the embodiment described and depicted, the invention is applied to the SD (Simple Definition) format of IEC 61834 or the "Blue Book" mentioned above.

Figure 1:
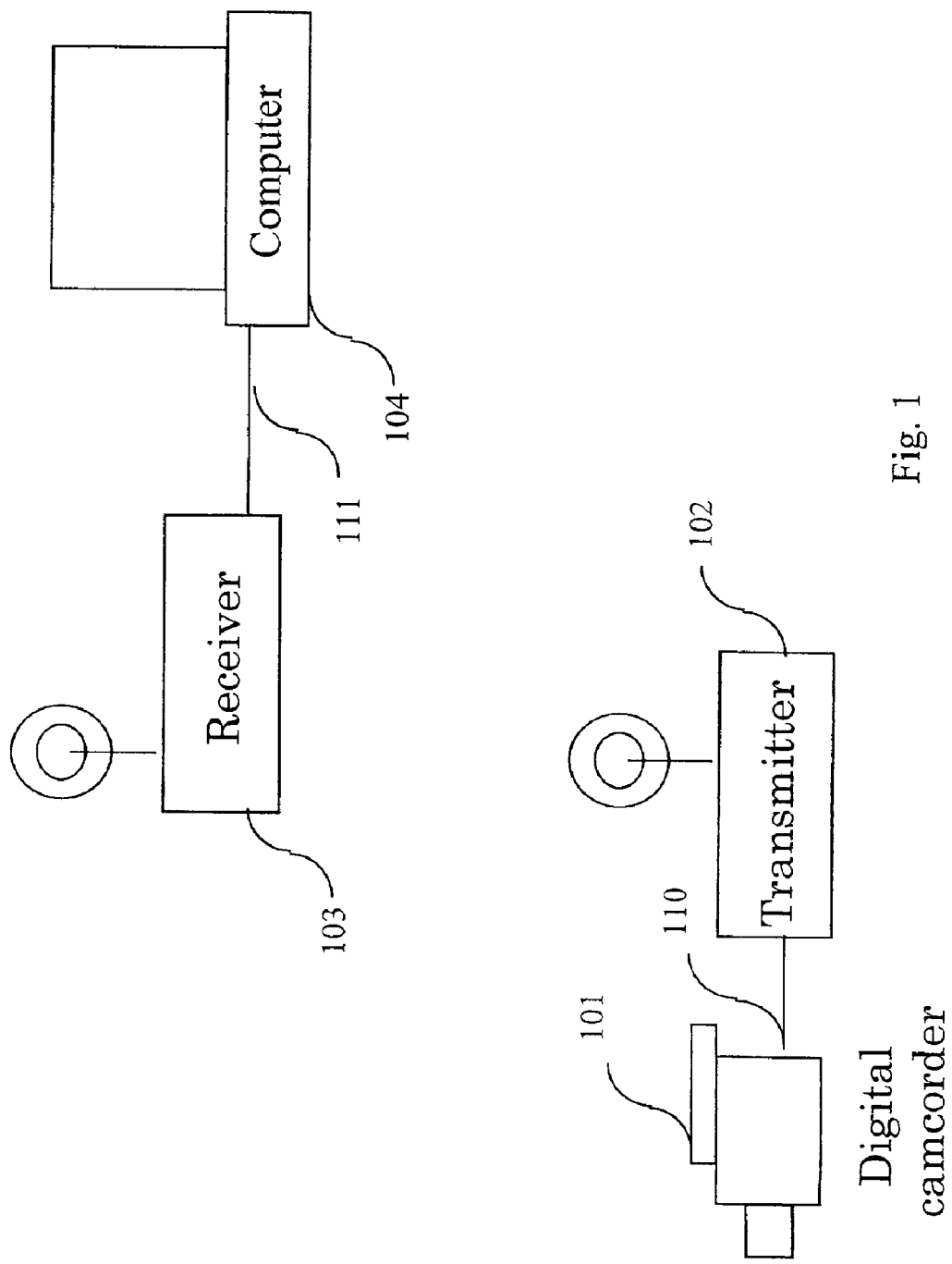
FIG. 1 depicts schematically a device in accordance with the present invention, used for the transmission of a video image from a camcorder to a computer, by means of a radio channel.

FIG. 1 shows an image information source 101, consisting here of a digital camcorder, connected by means of a bus 110 in accordance with IEEE 1394 to a device 102 for digital transmission on a wireless transmission medium of the radio type. A device 103 for digital reception on said medium is connected, by means of a bus 111 in accordance with IEEE 1394, to an image information destination 104, here consisting of a computer 104. The sending 102 and receiving 103 devices are respectively described with regard to FIGS. 9 and 10.

Transmission on the transmission medium is effected in simplex mode, that is to say all the transmissions take place from the sending device 102 to the reception device 102, without any transmission being effected in the reverse direction.

According to a variant which is not shown, the sending device 102 is integrated into the image information source 101. According to another variant, the reception device 103 is integrated into the image information destination 104. In each of these variants, the use of an IEEE 1394 bus can prove unnecessary. The exchange of DIF frames can then take place between the source 101 and the sending device 102 by means of a simple data and address bus. Likewise, the exchange of DIF frames can then take place between the reception device 103 and the destination 104, by means of a simple data and address bus.

According to another variant which is not shown, the transmission channel which separates the sending device from the reception device is a channel having an optical transmission medium, for example a channel supporting the transmission of infrared signals.

Figure 2:
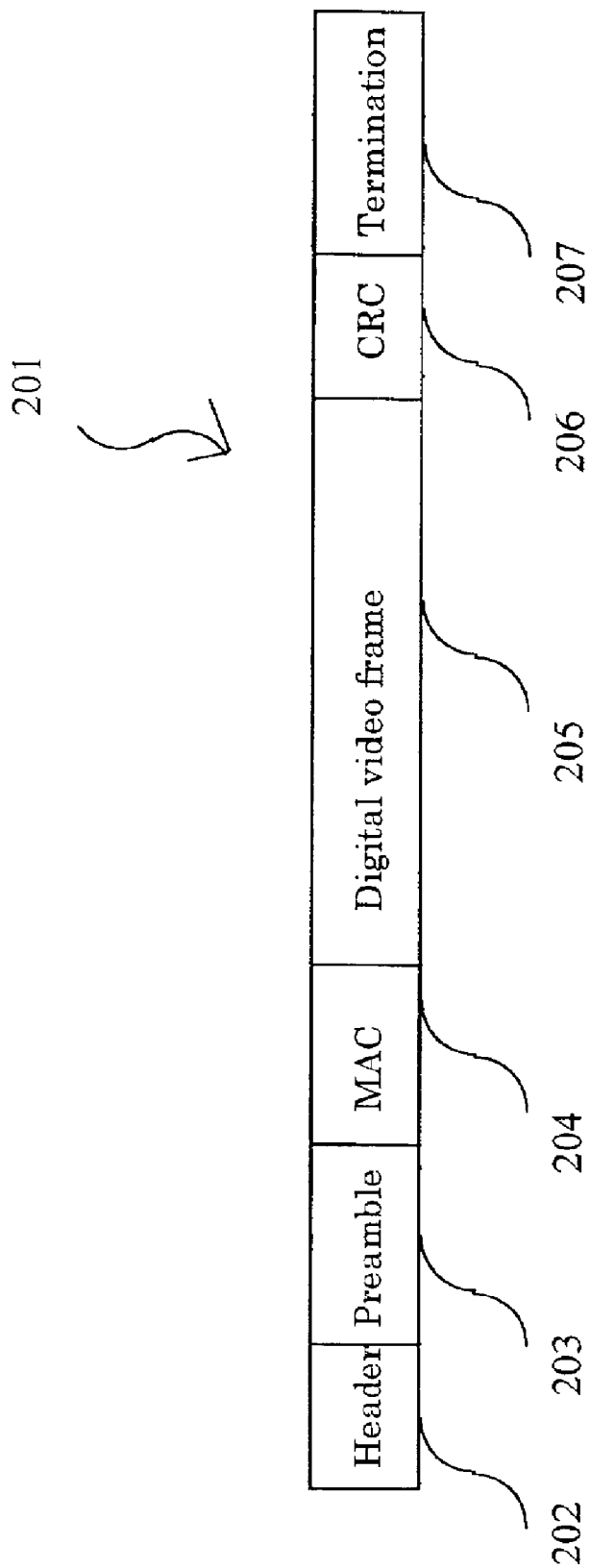
FIG. 2 depicts a radio frame format used by each embodiment of the device of the present invention.

FIG. 2 shows a radio frame format 201, in which there follow each other:

a header 202, serving in particular to allow the increase in power of an amplifier of the digital radio transmission device 102.

a preamble 203 serving in particular for bit and frame synchronisations and for the estimation of the transmission channel by the reception device 103, an information section necessary for implementing the communication protocol including notably an MAC (Medium Access Control) layer 204, a digital video data frame 205 according to a "reduced" DV format, in accordance with the teachings of the present invention, data 206 of an error detection code, and a termination 207 intended in particular for allowing a power drop in the amplifier of the sending device 102.

With regard to the data format adapter, which is situated between a data source to the DV format and a radio transmission medium, the DIF (digital interface) format represents a video frame in accordance with the DV standard mentioned above. A radio frame is divided into n DIF sequences according to the video standard used (n=10 in NTSC and n=12 in PAL). On the radio transmission medium, the available passband is limited and cannot support the data rate in the DV format.

Figure 3:
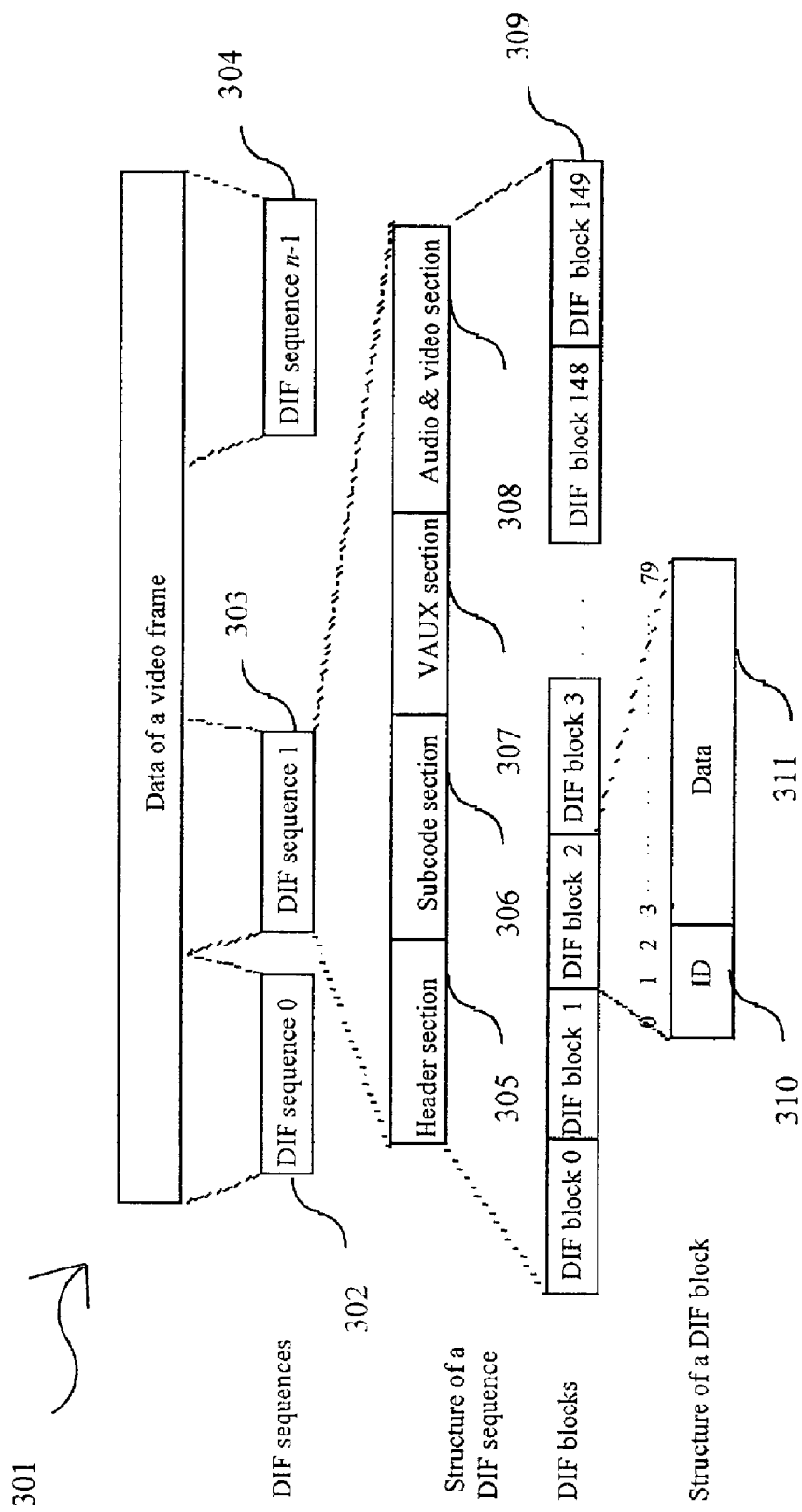
FIG. 3 depicts the organisation of the information in the DV format known in the state of the art.

FIG. 3 shows data of a video frame 301, broken down into DIF sequences 302 to 304, each DIF sequence including a header section 305, a subcode section 306, a VAUX (video auxiliary) section 307 and an audio-video section 308.

Each DIF sequence includes 150 DIF blocks 309 which each include an identifier 310 and data 311. A person skilled in the art should refer to Part II of the Blue Book mentioned above in order to have better knowledge of the meaning of the fields in the frame 301.

In some of the fields in the video frame 301, data are said to be "reserved", that is to say they are not able to take a meaning in a given version of the standard but are reserved for future versions or variants of the standard. The reserved data have, however, particular values provided for by the standard ("1" for each bit), which are therefore predictable for a given version of the standard.

The identifier 310 of each DIF block is predictable in a sequence of blocks, knowing the identifier of the first DIF block 309 of the audio video section, also referred to subsequently as "DIF block of the video type". As illustrated in FIG. 4, each identifier 310 includes three octets $ID_0$, $ID_1$, $ID_2$ (depicted vertically with the most significant bit "MSB" at the top).

By definition, in the remainder of the description, the term "first" bit of an octet is used for the least significant bit of this octet and the other bits are then arranged in increasing order of their weight. FIG. 5 shows that the last three bits of the first octet $ID_0$ take five triplets of different values according to the sections 305 to 308 of the DIF sequence concerned.

The fifth bit of the octet $ID_0$ and the first three bits of the second octet $ID_1$ are reserved bits. The first four bits of the first octet $ID_0$ and the last four bits of the second octet $ID_1$ are predictable numbers, in a DIF sequence:

the first four bits ($Seq_0$ to $Seq_3$) of the first octet $ID_0$ represent either the number of the sequence concerned in the video frame or a fixed value "$1111b$", when the source does not provide the number of the sequence or the DIF block is of the header or subcode type, the last four bits ($Dseq_0$ to $Dseq_3$) of the second octet $ID_1$ represent the number of the DIF sequence concerned in the video frame.

The value of the fourth bit of the second octet $ID_1$ is equal to "0" when the format used is the "SD" (Simple Definition) format. Finally, the bits of the last octet $ID_2$ represent the number of the DIF block 309 in the DIF sequence.

In accordance with particular characteristics of the present invention, for a DIF sequence of the "reduced" DV format, there is transmitted, for each initial DIF sequence, only a single reduced identifier field (see reference 361 with regard to FIG. 8) consisting of the first four bits of the first octet $ID_0$ and the fourth bit of the second octet $ID_1$ (whose value is "0" in the SD format and which, in the HD format, is referred to as "FSB" and takes the values "0" or "1") depending on the position of the block under consideration in the DIF sequence) of the first DIF block of the video type in the sequence.

Thus, in place of three octets each of the one hundred and fifty DIF blocks, only one octet is transmitted for all the DIF sequence. For the purpose of facilitating the implementation of the invention, the two octets $ID_0$ and $ID_1$ of the first video-type DIF block, can be transmitted as a whole.

According to a variant, only the reduced identifier field consisting of the first four bits of the first octet $ID_0$ of the first video-type DIF block of the sequence is transmitted. According to this variant, in place of three octets for each of the one hundred and fifty DIF blocks, only one octet is transmitted for all the DIF sequence.

For implementing this variant, the reception device 103 determines that it is a case of an SD format for example because its functioning is limited (by construction or by programming, for example), or by the reception, from the sending device 102, of a supplementary information item (not shown) representing the format used by the transmission.

According to another variant, not shown, for a DIF sequence of the "reduced" DV format, there is transmitted, for each initial DIF sequence, only one reduced identifier field consisting of the fourth bit of the second octet $ID_1$ of the first video-type DIF block in the sequence.

Thus, in place of three octets for each of the one hundred and fifty DIF blocks, only one bit is transmitted for the whole of the DIF sequence.

Figure 6:
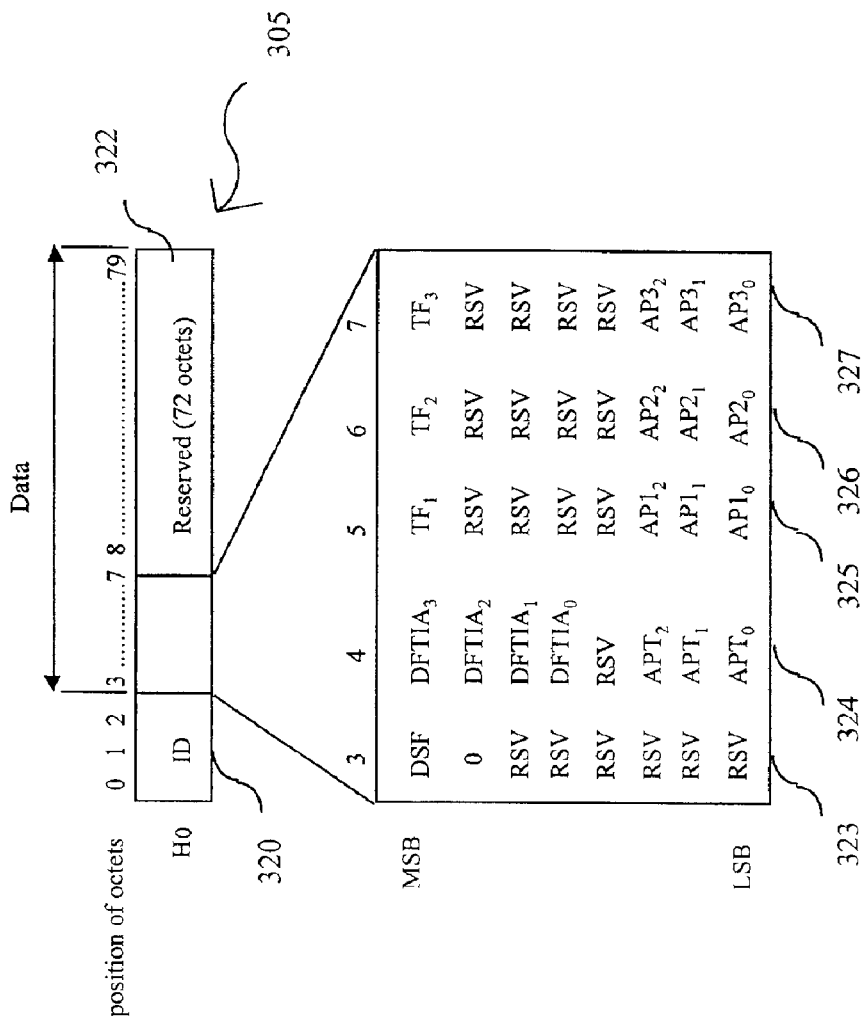
FIG. 6 depicts the data of a data block constituting the header section illustrated in FIG. 3.

FIG. 6 shows the header section 305 which includes an identifier 320, five non-reserved octets 323 to 327 and reserved data 322. The five non-reserved data 323 to 327 are depicted at the bottom of FIG. 6, vertically, with the most significant bit at the top.

It can be seen that, in accordance with particular characteristics of the present invention, the first six bits of the first octet 323, the fourth bit of the second octet 324, the fourth, fifth, sixth and seventh bits of the last three octets 325 to 327, which are reserved, are removed from the data transmitted in the "reduced" DV format.

It will in particular be noted that the last two bits of the octet 323 are transmitted: the last bit, referred to "DSF", is equal to "0" when there are ten DIF sequences in the video frame, and "1" when there are twelve of them; the second to last bit is equal to "0" for the SD format and "1" for the HD format. These last two bits can be used by the transmission device 102 in order to determine, as transmission progresses, the mode of reducing the reduced video frame, and by the reception device 103, in order to conform to this reduction mode.

According to a variant, only the 72 octets of reserved data 322 are removed.

Figure 7:
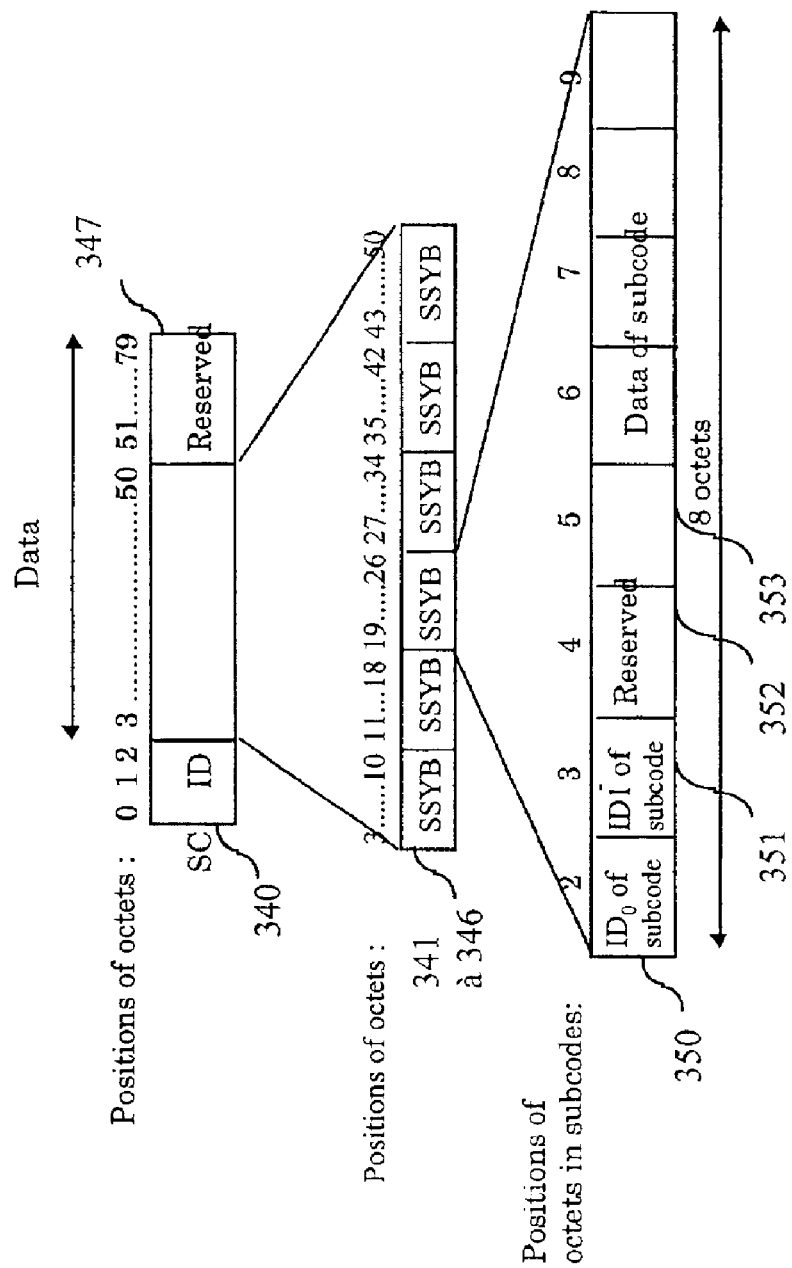
FIG. 7 depicts each data block constituting a section of subcodes illustrated in FIG. 3.

On the first line of FIG. 7, the structure of each of the two blocks which make up the subcode section 306 can be seen. Each block includes an identifier 340, six video synchronisation sections 341 to 346 and a reserved data section 347 (second line).

On the last line, it can be seen that each video synchronisation section includes two subcode identification octets 350 and 351, a reserved octet 352 and five subcode data octets 353.

In accordance with particular characteristics of the present invention, all the reserved data in the subcode section, that is to say thirty five octets, are removed from this section in the "reduced" DV format.

According to a variant, not shown, it is the entire subcode section which is removed. This is because, depending on the standard under consideration, this section is optional. For implementing this variant, on reception of the reduced DIF frame, the reception device 103 inserts in the frame a subcode section including the standardised so-called "NO INFO" (no information) information.

Figure 8:
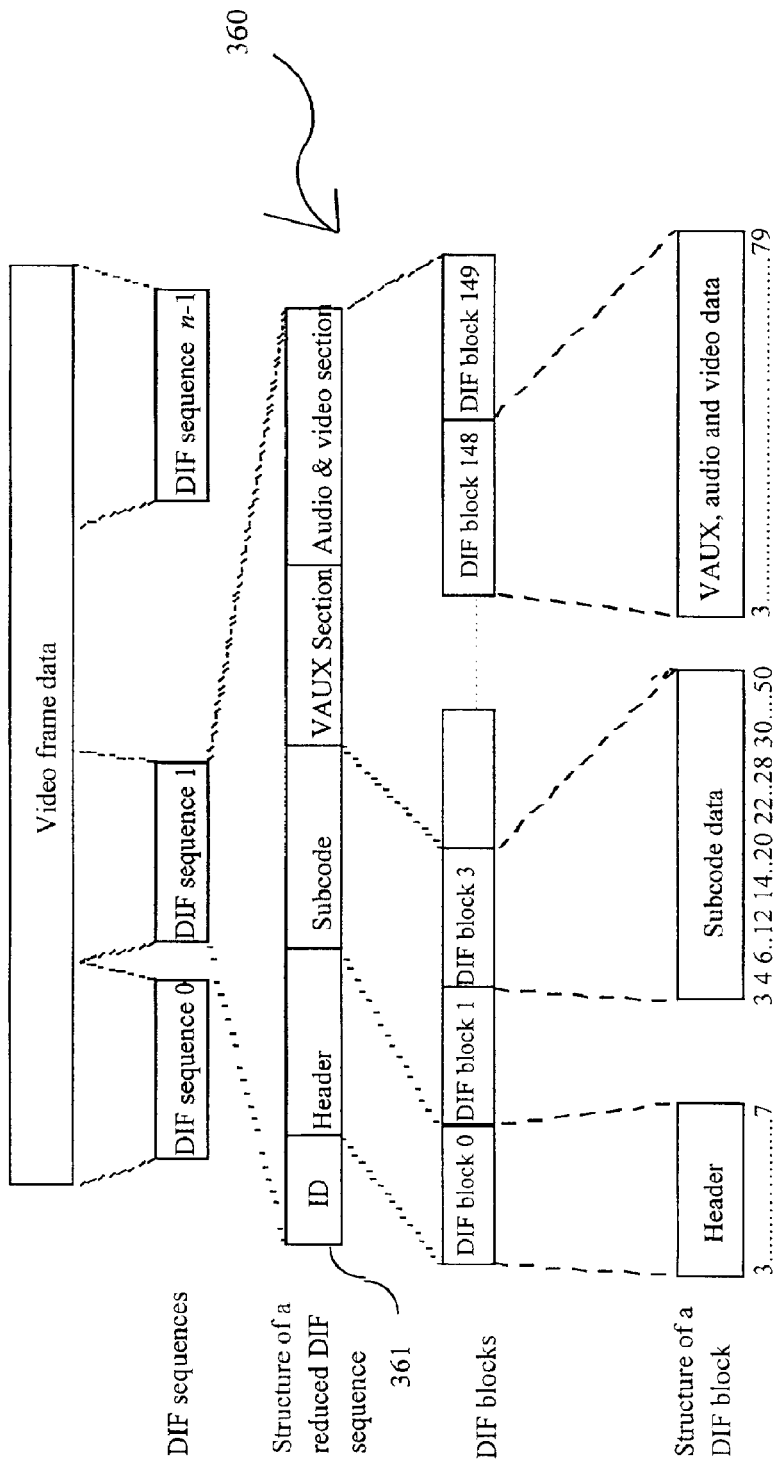
FIG. 8 depicts a sequence of data in accordance with the present invention.

Using all the ways of reducing the number of predictable data to be transmitted set out above, a frame illustrated in FIG. 8 is obtained in which the different sections have been "reduced", so that the DIF blocks 360 contain very few predictable data and a sequence identification section 361 is placed at the head of the DIF sequence, before the reduced header section.

On the other hand, the video and audio data have not been modified.

Using all the characteristics of the invention which are disclosed above, apart from the variants, a complete sequence which initially contained 12,000 bits contains, once compressed, 11,409 of them.

According to a variant, not shown, the sequence identification section 361 is also not transmitted. This variant applies to the case where the sequence identifiers bear incremented values, from sequence to the next. For implementing this variant, on reception of the reduced DIF frame, the reception device 103 inserts in the frame a header section including the standardised so-called "NO INFO" (no information) information.

It can be seen here that the Blue Book mentioned above does not relate to the use of magnetic media 6.3 mm wide but that the invention immediately adapts to any other type of information medium.

In addition, the invention applies both to the "SD" format, as described above, and to the "HD" (high definition) format, by means of obvious adaptations, and, more generally, to the other data formats which are cited in the Blue Book mentioned above: EDTV2, PALPlus, SD "High Compression", DVB and ATV.

The invention applies particularly well to data transmissions in which large sets of data are not fragmented and therefore do not require a large number of identification or synchronisation data.

Thus, in the case illustrated in FIGS. 1 to 8, the radio frame contained all the reduced video frame and its very structure makes it possible to identify, without ambiguity, the bits of the initial data frame, and their ranking. It is therefore unnecessary to mark the data in this frame.

The preamble of the radio frame enables the receiver to have synchronisation on the bits of the transmission and then on the frame.

The reception device reconstitutes the entire data frame in the DV format (see operation 1204, FIG. 2).

In cases where the invention is applied to the transmission of frames whose length is not constant, the end of the frame is marked and/or the length of the frame is indicated by specific information, explicitly or implicitly, by use of a code taking a few values corresponding to particular frame lengths.

Thus, in accordance with general characteristics of the first aspect of the present invention, the number of predictable data which accompany information representing a physical quantity are reduced, so that the data and information representing a physical quantity resulting from this reduction allow the reconstitution of predictable data accompanying the information representing a physical quantity, in accordance with the initial digital format.

Figure 9:
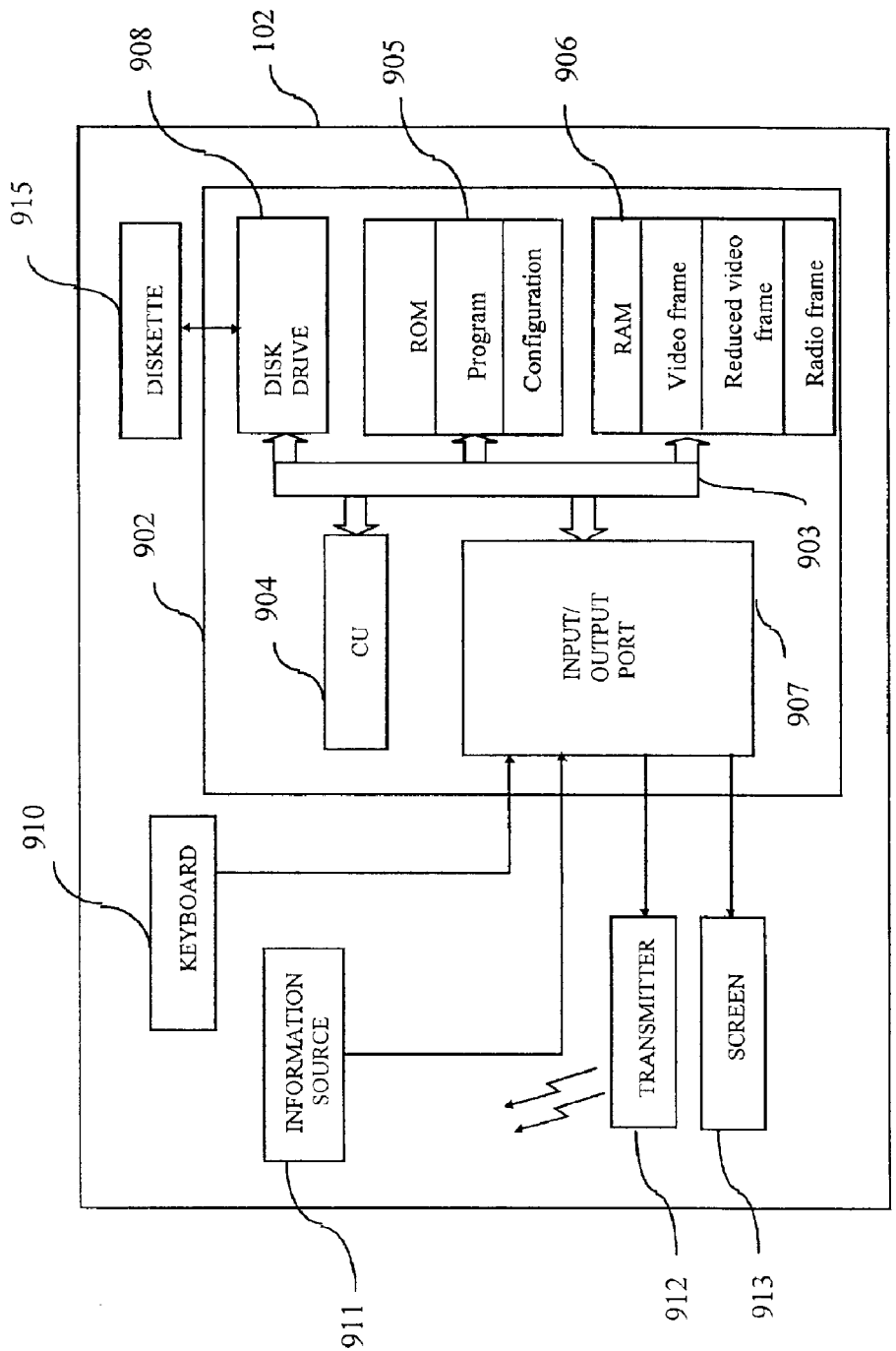
FIG. 9 depicts, in the form of a block diagram, a radio frame transmission device in accordance with the present invention.

FIG. 9 shows a radio transmission device 102, which has a processing circuit 902 including, around a bus 903, a central unit 904, a read only memory 905, a random access memory 906, an input/output port 907 and a disk drive 908.

Aside from the processing circuit 902, a keyboard 910, an image information source 911, a radio transmitter 912 and a screen 913 are connected to the input/output port 907.

Each of the components illustrated in FIG. 9 is well known to persons skilled in the art of processing and/or communication devices. These components are therefore not detailed here.

The read only memory 905 has memory areas which store on the one hand the operating program of the central unit 904 and on the other hand the initial configuration data for the device 102.

The random access memory 906 contains memory areas which store on the one hand the video frame to be transmitted in the DV format (IEC 61834 or Blue Book) and on the other hand the reduced video frame, in the "reduced" DV format and, finally, the radio frame to be transmitted.

A diskette 915 contains instructions on a program able to be executed by the processor 904 for implementing the method which is the object of the present invention.

The diskette 915 and the read only memory 905 constitute an information storage means which can be read by a computer or a microprocessor storing instructions of a computer program for implementing the method of the invention as briefly disclosed above.

Figure 10:
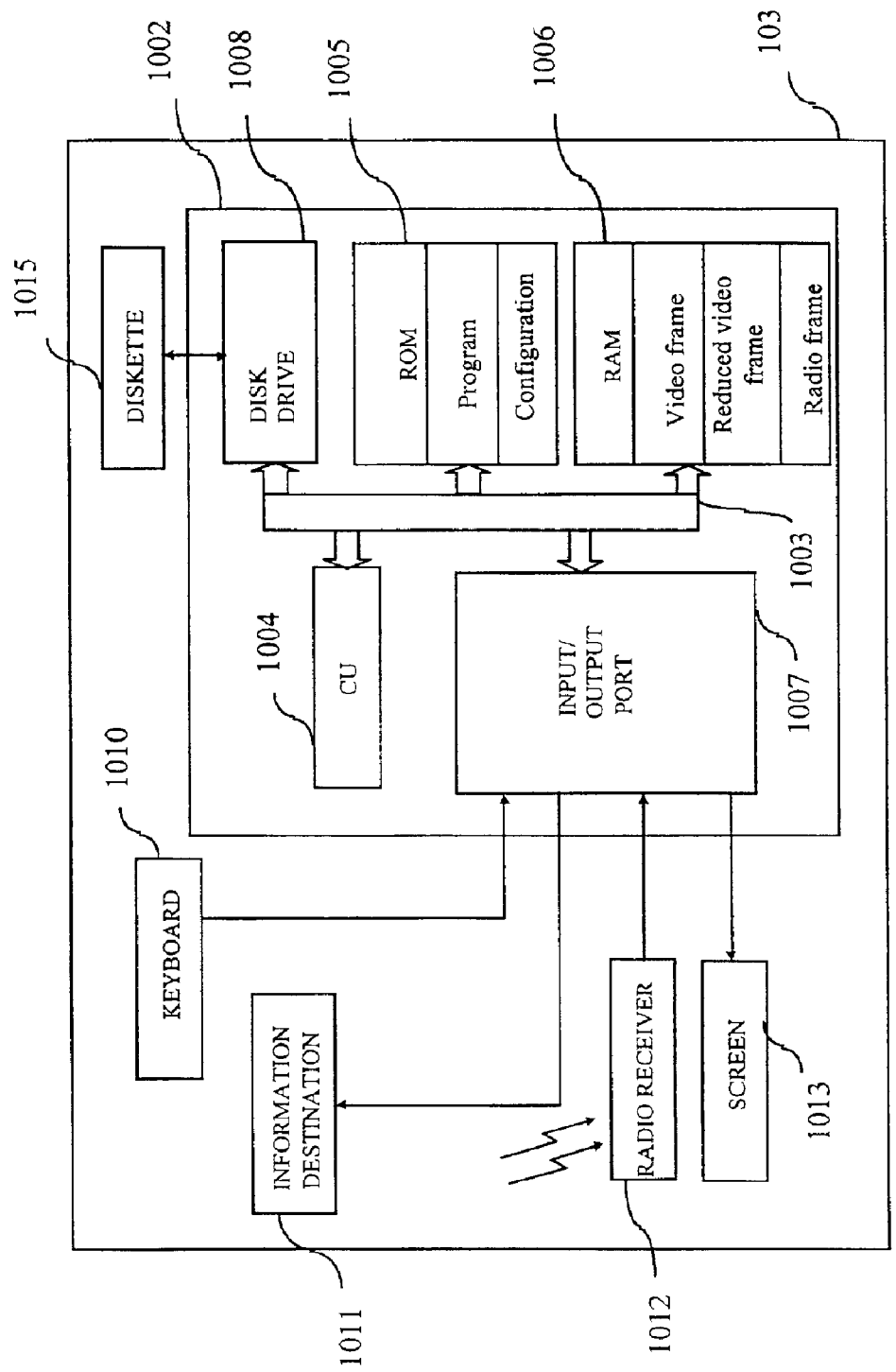
FIG. 10 depicts, in the form of a block diagram, a radio frame reception device in accordance with the present invention.

FIG. 10 shows a radio reception device 103, which includes a processing circuit 1002 including, around a bus 1003, a central unit 1004, a read only memory 1005, a random access memory 1006, an input/output port 1007 and a disk drive 1008.

Aside from the processing circuit 1002, a keyboard 1010, an image information destination 1011, a radio receiver 1012 and a screen 1013 are connected to the input/output port 1007.

Each of the components illustrated in FIG. 10 is well known to persons skilled in the art of processing and/or communication devices. These components are therefore not detailed here.

The read only memory 1005 contains memory areas which store on the one hand the operating program of the central unit 1004 and on the other hand initial configuration data for the device 103.

The random access memory 1006 contains memory areas which store on the one hand the received radio frame and on the other hand the transmitted radio frame, in the "reduced" DV format, and finally the reconstituted video frame, in the DV format (IEC 61834 or Blue Book).

A diskette 1015 contains instructions of a program able to be executed by the process 1004 for implementing the method which is the object of the present invention.

Figure 11:
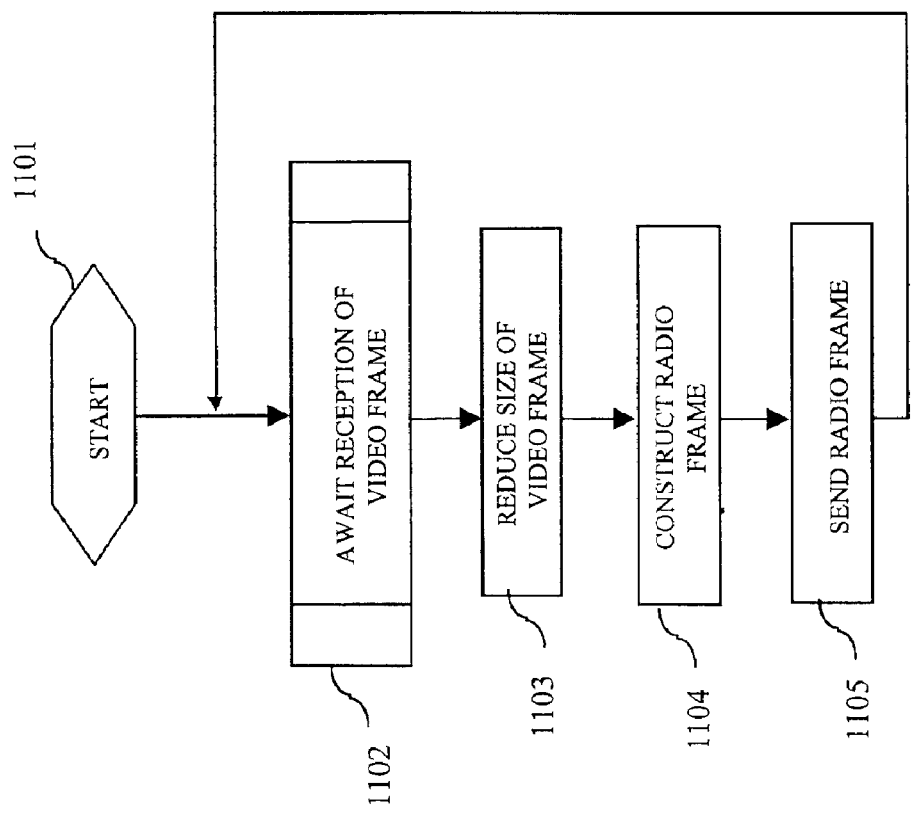
FIG. 11 depicts schematically a flow diagram implemented by the device illustrated in FIG. 9.

FIG. 11 shows that, after an initialisation step 1101, the central unit 904 of the device 102 awaits 1102 reception of a video frame in the DV format (IEC 61834 or Blue Book), coming from an image information source 911. When such a video frame has been received, the central unit 904 performs a step 1103 of "reducing" the data in accordance with the method of the present invention.

Then, during a step 1104, the central unit 904 constructs a radio frame containing the reduced video frame, as disclosed above. Finally, during a step 1105, the central unit 904 controls the sending of the radio frame by the radio transmitter 912. Then the waiting 1102 is reiterated.

As a variant to step 1103, the central unit 904 writes to the random access memory 906 only the data of the video frame which are selected in order to form an entire frame in accordance with FIG. 8.

Figure 12:
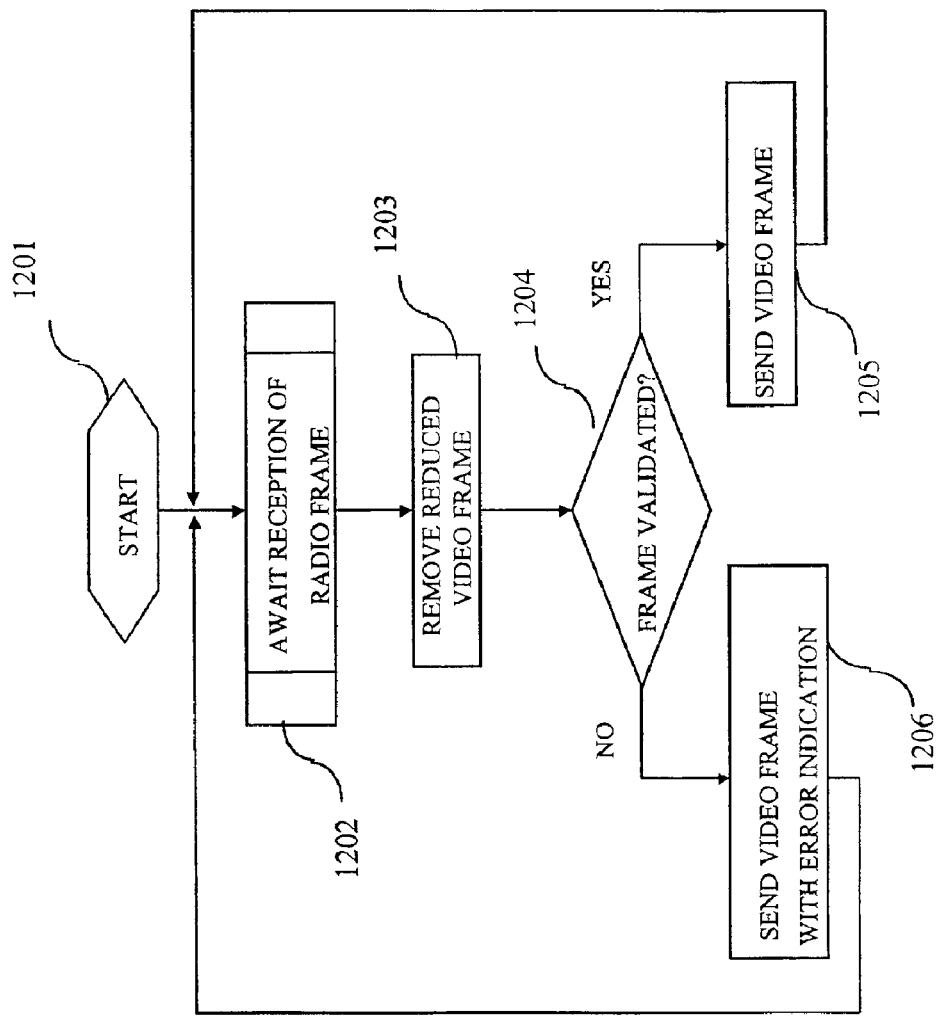
FIG. 12 depicts schematically a flow diagram implemented by the device illustrated in FIG. 10.

FIG. 12 shows the functioning of the device 103 illustrated in FIG. 10. Following an initialisation step 1201 the central unit 1004 goes into a state 1202 of awaiting the reception of a data frame coming from the radio receiver 1012. Then, when this reception is effected, the central unit 1004 removes the reduced video frame, in the "reduced" DV format, during a step 1203. Then, during a test 1204, the central unit 1004 determines whether or not the reduced video frame is valid, by using, in a known fashion, the data 206 of the error detection code. When the result of test 1204 is positive, the video frame is reconstituted (step 1205) and transmitted to an image information destination 1011, such as a computer or telecommunication network, a computer, an image storage means such as, for example, a video tape recorder, an image display means such as, for example, a video monitor, a printer, etc.

When the result of test 1204 is negative, during a step 1206, the invalid video frame is reconstituted and is associated with a transmission error indication before being transmitted to the destination. To this end, the reception device 103 uses the possibility, mentioned by the Blue Book mentioned above, of marking the erroneous sections. In this case, the subcode sections VAUX and MUX are replaced by so-called "NO INFO" (no information) standardised information, the audio data are replaced by an audio error code and a standardised value representing the existence of an error is allocated to the field "STA" of the video section.

During each of steps 1205 and 1206, in order to reconstitute a data frame in accordance with IEC 61834 or the specifications of the Blue Book, using the frame illustrated in FIG. 8, the device 103 performs the following operations:

- the reduced identifier field 361 is removed from the DIF sequence and the data which make it up are used for reconstituting the identifiers 310 for each DIF block:
- the last three bits of the first octet $ID_0$ take one from amongst the different values, according to the section 305 to 308 of the DIF sequence which is concerned, and according to the type of data of the block under consideration,
- the fifth bit of the octet $ID_0$ and the first three bits of the second octet $ID_1$ are reserved bits, which therefore take the value "1",
- the first four bits of the first octet $ID_0$ take a value "$1111b$" for the subcode and header sections, for the other sections, take values copied from the reduced identifier field 361 (however, when, in accordance with a variant, the four values Seq have not been transmitted, the value "$1111b$" will always be taken),
- the value of the fourth bit of the second octet $ID_1$ is equal to "0" when the format used is the "SD" (Simple Definition) format,
- the bits of the octet $ID_1$ represent the DIF sequence number in the video frame and are therefore determined by incrementing a computer reset to "0" at the start of each video frame;
- finally, the bits of the last octet $ID_2$ represent the number of the DIF block 309 in the DIF sequence and are therefore determined by incrementing a counter reset to "0" at the start of each DIF sequence;
- in order to reconstitute the header section 305:
- each bit of the reserved data is restored with the value "1", and
- the other data are copied from the reduced frame received;
- in order to reconstitute the reserved data:
- the value "1" is allocated to each reserved data item, and
- the other values are copied from the reduced frame transmitted;
- in order to reconstitute the non-reserved data of the subcode section 306, these data are copied from the reduced frame;
- in order to reconstitute the data of the VAUX sections 307 and audio and video sections 308, these data are copied from the reduced frame.

It should be noted, however, that, during step 1205, the STA field of the video section is copied into the reduced frame whereas, during step 1206, a standardised value representing the existence of an error is allocated to the field "STA" of the video section.

Thus, in accordance with the present invention, the data and information representing a physical quantity resulting from the reduction effected in the transmission device 102 and which constitute the transmitted reduced frame, make it possible to reconstitute predictable data accompanying the information representing a physical quantity, in accordance with the initial digital format.

To this end, the reception device 103 performs:

- an operation of reading at least some of said received data,
- an operation of determining predictable data representing received data and whose value is independent of that of the information, said predictable data being greater in number than the number of received data, and
- an operation of organising said predictable data and said information, said organisation being in accordance with said digital format and causing predictable data and information to alternate.

According to a variant, not shown, the reception device 103 stores in memory a DIF frame whose data with a value fixed by the standard, in particular the reserved data, are initialised to these values before the reception of a "reduced" DIF frame. Next, the received data are inserted in this frame, on reception of the "reduced" DIF frame.

Following each of steps 1205 and 1206, the central unit 1004 returns to a waiting state 1202.

According to another variant, when the frame is not valid (result of test 1204 negative), this frame is not transmitted but a "concealment" procedure is applied For example, the video frame can be repeated in place of the invalid video frame.

Another variant is adapted to a radio transmission protocol including an acknowledgement step consisting, when the reception device has correctly received a frame, of causing it to send, to the radio transmission device, a message acknowledging correct reception of the frame. This variant requires that:

- the transmission device 102 should have an acknowledgement reception means, and
- the reception device 103 should have an acknowledgement sending means.

In accordance with this variant, when the result of test 1204 is negative, no acknowledgement message is transmitted to the radio transmission device 102. When the radio transmission device does not receive any acknowledgement message during a predetermined period which follows the transmission of a frame, it retransmits this frame. For implementing this variant, a frame duplication prevention mechanism well known to persons skilled in the art of telecommunications is then installed in the transmission 102 and reception 103 device.

According to another variant, the error detection data 206 are replaced or supplemented by an error correction code, which enables the reception device 103 to correct certain transmission errors before performing the test 1204 (this test then giving a negative result only if it has not been possible to correct all the transmission errors).

According to another variant, no error detection data 206 is used and each frame will be considered to be valid.

According to another variant, the radio transmission concerns not only image data but also so-called "additional" data, control or parameterising data, or complementary data, data which normally pass over a bus (here the IEEE 1394 bus). Preferentially, the transmission then takes place in half duplex or full duplex mode. In this variant, implementation of the present invention can also include a reduction in the number of predictable data in the additional data.

It should be noted that the invention applies both to storage devices and to transmission devices (illustrated in the figures). This is because:

the storage medium of the first corresponds to the transmission medium of the second, writing to the storage medium corresponds to sending on the transmission medium, and reading on the storage medium corresponds to reception on the transmission medium.

The frame reduction set out above makes it possible, in a storage device, to reduce the quantity of memory needed to store given information.

In addition, the stored information is, like the transmitted information, accompanied by synchronisation and identification data, generally in a frame header.

The present invention is advantageously combined with a method of compressing the payload (here the data representing an image). For example, the data compression methods which compress data in the HD formats to the SD format or from the SD format to the SD "high compression" format, advantageously supplement the compression method which is the object of the present invention.

Any communication means has available a certain passband and any storage means has available a certain storage capacity. In accordance with the particular characteristics of the present invention:

when this passband (or respectively this capacity) is sufficient for transmission (or respectively storage) of the DIF frame before reduction, this frame is transmitted (or respectively stored);

when this passband (or respectively this capacity) is not sufficient for the transmission (or respectively the storage) of the DIF frame before reduction, but it is sufficient for the transmission (or respectively the storage) of the DIF frame after reduction, without compression of the payload, it is the reduced DIF frame which is transmitted (or respectively stored); and when this passband (or respectively this capacity) is not sufficient for the transmission (or respectively the storage) of the DIF frame after reduction, a step of compression of the payload (of a type known to persons skilled in the art) is effected and its is the reduced DIF frame containing the compressed payload which is transmitted (or respectively stored).

For implementing this variant, the method of the invention includes:

an operation of estimating the need for a reduction in the quantity of data and information representing a physical quantity, and when said reduction is necessary, the implementation of a compression method as disclosed with regard to the figures, an operation of estimating the need for compression of the information representing a physical quantity, and when said compression is necessary, an operation of compressing the information representing a physical quantity.

When it is necessary to reduce still further the number of binary data representing a video frame, according to a variant which is not shown, the data ancillary to the audio data ("AAUX") are also removed. Likewise, the data ancillary to the video data ("VAUX") can be removed.

According to a second variant which is not shown, by virtue of an adapted transmission protocol, the transmission parameters incorporated in a DIF frame are transmitted only when their value changes. This is because certain parameters are fixed for a long series of successive frames and their transmission in each frame is generally unnecessary.

What is claimed is:

1. A method of compressing a DV format in which information representing a physical quantity is accompanied by data having a value independent of that of the information representing a physical quantity and dependent on the DV format, comprising an operation of removing the data, wherein the data removed in the removing can be reconstituted knowing the DV format.

2. The method according to claim 1, in which, during the removing, reserved data are removed.

3. The method according to claim 1, in which, during the removing, identifiers of parts of a set of data are removed.

4. A data and information processing method in which a physical quantity is represented by a predetermined quantity of data and information, the method comprising the steps of:

estimating a need to reduce a quantity of data and information representing a physical quantity, and when reduction is necessary, implementing a compression method according to claim 1.

5. A method for transmitting information representing a physical quantity, wherein the information is accompanied by data, according to a predetermined DV format, the method comprising:

an operation of removing the data, the data having a value independent of the information representing a physical quantity and dependent on the DV format, wherein the data removed in the removing can be reconstituted knowing the DV format, an operation of receiving the information and the data, an operation of reconstituting data in accordance with the DV format, the reconstituted data representing the received data and being independent of the information and greater in number than the number of data items received, and an operation of organizing the reconstituted data and the information, in accordance with the DV format.

6. A method of recording information representing a physical quantity, comprising:

an operation of removing data accompanying the information representing a physical quantity, the data having a value independent of the information representing a physical quantity and dependent on a DV format, wherein the data removed in the removing can be reconstituted knowing the DV format, an operation of recording data and information representing a physical quantity, on a recording medium, an operation of reading the information and the data, on the recording medium, an operation of reconstituting data in accordance with the DV format, the reconstituted data representing the read data and being independent of the information and greater in number than the number of received data, and an operation of organizing the reconstituted data and the information, in accordance with the DV format.

7. A method of receiving information representing a physical quantity accompanied by data having a value independent of that of the information and dependent on a predetermined DV format, comprising:

an operation of reading at least part of the received data, an operation of determining data that has been removed and which can be reconstituted knowing the DV format, the data representing the received data and having a value independent of that of the information and dependent on the DV format, the data being greater in number than the number of received data, and an operation of organizing the data and the information, the organization being in accordance with the DV format and causing data and information to alternate.

8. A method of receiving information representing a physical quantity, organized in accordance with a first structure including the information and structural data, in frames in accordance with a second structure and also including complementary data, comprising:

an operation of marking the information in the frames, an operation of marking the structural data in the frames, an operation of determining data that has been removed and which can be reconstituted knowing the digital format, the data having a value independent of the information and the complementary data and dependent on the digital format, the data representing structural data, and an operation of organizing, in accordance with a third structure, the information and the data.

9. The method of receiving information according to claim 8, in which, during the marking operation, the second structure is that of a wireless transmission protocol.

10. The method of receiving information according to either one of claim 8 or 9, in which, during the organizing operation, the third structure is that of a protocol for transmitting or storing digital images.

11. A method of transmitting information representing a physical quantity, comprising:

an operation of determining data intended to accompany the information, having a value independent of that of the information and dependent on a DV format, an operation of sending or storing the information and the data, an operation of receiving or reading, respectively, the information representing a physical quantity, accompanied by the data, an operation of reading at least part of the received data, an operation of determining data that has been removed and which can be reconstituted knowing the DV format, the data representing received data and having a value independent of that of the information and dependent on the DV format, the data being greater in number than the number of received data, and an operation of organizing the data and the information, the organization being in accordance with the DV format alternating data and information.

12. A device compressing a DV format in which information representing a physical quantity is accompanied by data having a value independent of that of the information representing a physical quantity and dependent on the DV format, comprising means for removing the data, wherein the data removed in the removing can be reconstituted knowing the DV format.

13. The device according to claim 12, further comprising means for reading data in the DIF format.

14. The device according claim 12, further comprising means for reading on an IEEE 1394 bus.

15. A data and information processing device, comprising:

means for estimating the need for reduction in the quantity of data and information representing a physical quantity, and a compression device according to claim 12, the estimation means being adapted to use the compression device when the reduction is necessary.

16. A device receiving information representing a physical quantity accompanied by data having a value independent of that of the information and dependent on a predetermined DV format, comprising:

means for reading at least part of the received data, means for determining data that has been removed and which can be reconstituted knowing the DV format, the data representing received data and having a value independent of that of the information and dependent on the digital DV format, the data being greater in number than the number of received data, and means for organizing the data and the information, the organization being in accordance with the DV format and causing data and information to alternate.

17. A device recording information representing a physical quantity, comprising:

means for removing data accompanying the information representing a physical quantity, the data being independent of the information representing a physical quantity and dependent on the DV format, wherein the data removed in the removing can be reconstituted knowing the DV format, means for recording data and information representing a physical quantity resulting from this removing, on a recording medium, means for reading the information and the data resulting from the removing, on the recording medium, means for reconstituting data in accordance with the DV format, the reconstituted data representing the read data and being independent of the information and greater in number than the number of received data, and means for organizing the reconstituted data and the information, in accordance with the DV format.

18. A device decompressing information representing a physical quantity organized in a first structure including the information and structural data, in frames in accordance with a second structure and also including complementary data, comprising:

marking means, adapted to mark the information in said the frames, and to mark the structural data in the frames, means for determining data that has been removed and which can be reconstituted knowing a digital format, the data having a value independent of the information and the complementary data and dependent on the digital format, the data representing structural data, and means for organizing, in a third structure, the information and the data.

19. The device according to claim 18, in which the marking means is adapted to mark the information and the structural data in a second structure which is that of a wireless transmission protocol.

20. The device according to either one of claims 18 or 19, in which the organization means is adapted to organize the information and the data in a third structure which is that of a digital image storage or transmission protocol.

21. The method according to claim 1, further comprising a step of providing a supplementary information item representing the DV format, in order to allow reconstitution of the data removed in the removing.

* * * * *

UNITED STATES PATENT AND TRADEMARK OFFICE
CERTIFICATE OF CORRECTION

PATENT NO. : 6,876,814 B1
DATED : April 5, 2005
INVENTOR(S) : Claude Le Dantec

It is certified that error appears in the above-identified patent and that said Letters Patent is hereby corrected as shown below:

Title page,
Item [56], References Cited, OTHER PUBLICATIONS,
"Light" reference, "Rosemont, III.," should read -- Rosemont, Ill., --; and
"Seong," reference, "III.," should read -- Ill., --.

Column 2,
Line 35, "etc)" should read -- etc.) --.

Column 3,
Line 45, "predetermined," should read -- predetermined --.

Column 6,
Line 45, "there" should read -- they --; and
Line 49, "device 102." should read -- device 102, --.

Column 8,
Line 54, "thirty five" should read -- thirty-five --.

Column 11,
Line 12, "MUX" should read -- AAUX --.

Column 12,
Line 31, "applied" should read -- applied. --.

Column 13,
Line 46, "its" should read -- it --.

Column 15,
Line 62, "according" should read -- according to --.

UNITED STATES PATENT AND TRADEMARK OFFICE
CERTIFICATE OF CORRECTION

PATENT NO. : 6,876,814 B1
DATED : April 5, 2005
INVENTOR(S) : Claude Le Dantec

It is certified that error appears in the above-identified patent and that said Letters Patent is hereby corrected as shown below:

Column 16,
Line 44, "the frames," should read -- frames, --.

Signed and Sealed this

Seventeenth Day of January, 2006

JON W. DUDAS
*Director of the United States Patent and Trademark Office*